May 29, 1945.    R. J. VAN DE HEY    2,377,195
TRACTOR LUG
Filed Nov. 8, 1943
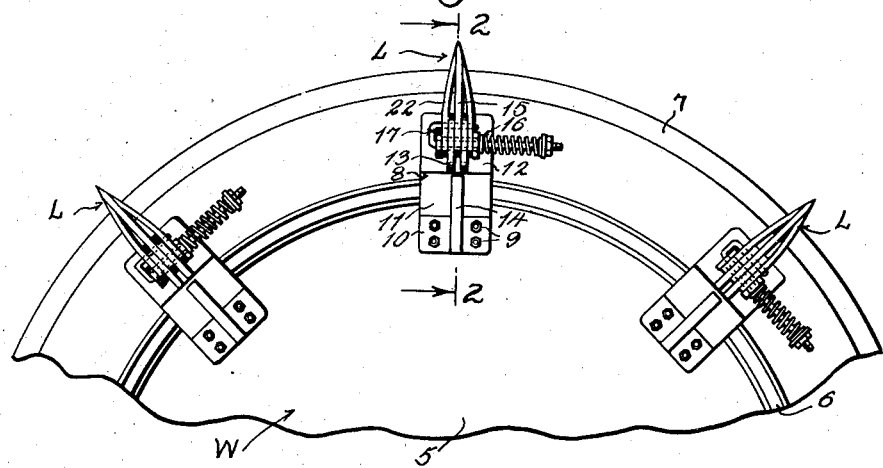
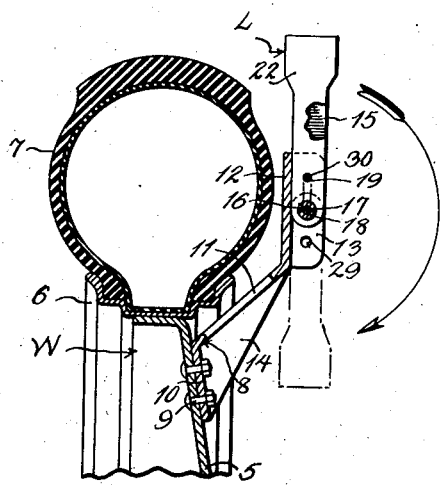
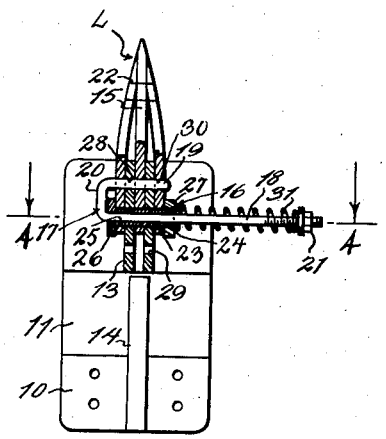
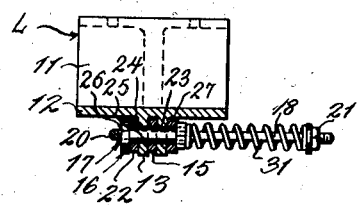
INVENTOR
ROCHE J. VAN DE HEY
BY
ATTORNEYS Patented May 29, 1945

2,377,195

UNITED STATES PATENT OFFICE 2,377,195

TRACTOR LUG

Roche J. Van De Hey, Manitowoc, Wis.

Application November 8, 1943, Serial No. 509,414

2 Claims. (Cl. 301—45)

This invention appertains to tractors and more particularly to a novel wheel lug therefor.

One of the primary objects of my invention is to provide a novel spade lug for rubber tired tractor wheels, which will insure proper traction for the wheels under conditions, where the rubber tires fail to grip the surface over which the tractor is operating, such as muddy or soft ground and over wet or green grass.

Another salient object of my invention is to provide a spade lug for tractor wheels which can be carried by the wheel at all times and which can be quickly and easily swung into an operative position to project beyond the tread of the tire or to an inoperative position inwardly of the tire toward the hub of the wheel.

Another salient object of my invention is to provide a single device which can be quickly and easily manipulated for holding the spade lug either in its operative or inoperative position.

A further important object of my invention is to provide a device of the above character which will be durable and efficient in use, one that will be simple and easy to manufacture and one which can be incorporated with a tractor wheel at a small cost, without any change in the construction thereof.

With these and other objects in view the invention consists in the novel construction, arrangement and formation of parts, as will be hereinafter more specifically described, claimed, and illustrated in the accompanying drawing, in which drawing:

Figure 1 is a fragmentary, side, elevational view of a tractor wheel showing my novel spade lugs attached thereto, the lugs being shown swung to their operative position, parts of the view being shown broken away and in section to illustrate structural detail.

Figure 2 is an enlarged, fragmentary, detail, sectional view taken on the line 2—2 of Figure 1 looking in the direction of the arrows, the view showing one spade lug in its operative position in full lines and in its inoperative position in dotted lines.

Figure 3 is an enlarged, front, elevational view of one of my novel lugs removed from the wheel, parts of the view being shown broken away and in section.

Figure 4 is a transverse, sectional view taken on the line 4—4 of Figure 3 looking in the direction of the arrows.

Referring to the drawing in detail, wherein similar reference characters designate corresponding parts throughout the several views, the letter W indicates a tractor wheel and L my novel spade lugs therefor.

The wheel W can be considered of any approved type now employed by tractors and for the purpose of illustration I have shown the wheel as including the disc body 5 carrying a rim 6 for a rubber tire 7. My spade lugs L are mounted at equi-distantly spaced points around the wheel and as all of the lugs are constructed the same, only one will be described in detail.

Each of my spade lugs L includes an attaching bracket 8 which is welded or otherwise secured to the outer face of the wheel body 5 adjacent to the rim 6. As shown, bolts 9 are utilized for securing the bracket in position. The bracket includes the attaching face plate portion 10, the outwardly and radially extending body 11, and the spade lug carrying plate 12. This plate 12 extends beyond the rim in close proximity to the outer wall of the tire 7 and has formed on its outer face spaced parallel guide ribs 13. The bracket 8 is preferably reinforced by a strengthening flange 14 which extends from the attaching face plate 10 to the spade carrying portion 12 along the body 11. The guide ribs 13 extend radially of the wheel and the ribs receive between the same the spade lug 15.

I provide novel means 16 for hingedly supporting the blade 15 and for latching the blade in its operative or inoperative position.

This means 16 includes a U-shaped bolt 17 having a long leg 18 and a relatively short latch leg 19. The legs 18 and 19 are connected by a bight portion 20. The outer end of the long leg 18 is threaded for a nut 21, the purpose of which will be later set forth.

The spade lug 15 is braced by side plates 22 and these plates extend along the opposite sides of the lug 15 from the point thereof to the inner end thereof. These reinforcing plates 22 engage the outer faces of the guide ribs 13.

The guide ribs 13 adjacent to their transverse center are provided with aligned openings 23 for receiving a bearing sleeve 24. The spade lug 15 and its strengthening plates 22 are provided with similar openings 25 for receiving the bearing sleeve and consequently the spade lug can be swung on said sleeve. One end of the bearing sleeve is provided with a head 26 and the opposite end can be provided with a nut 27 for holding the sleeve in place.

The long leg 18 of the U-shaped latch bolt 17 is slidably mounted in the sleeve as is clearly shown in Figures 2, 3, and 4.

The guide ribs on each side of the openings 23 are provided with registering openings 28 and 29 and the short leg 19 of the latch bolt can be selectively placed in either set of the openings 28 or 29, as may be desired. The blade 15 and its strengthening plates 22 beyond the pivot openings 25 are provided with latch openings 30 and these openings 30 are adapted to register with the openings 28 when the spade lug is in its operative position and are adapted to register with the openings 29 when the spade lug is in its inoperative position.

The U-shaped latch bolt 17 can be shifted laterally to move the short leg 19 thereof out of the openings in the ribs 13 and the spade lug, so that the spade lug can be moved either to its operative or inoperative position. An expansion spring 31 is coiled about the long leg 18 of the bolt 17 and is confined between the nut 21 and the bearing sleeve 24 and this spring functions to hold the U-shaped bolt in a desired selected position. Tht nut 21 holds the spring 31 in place and can be turned to adjust the tension of the spring within certain limits.

Considering that the blade or lug proper 15 is swung to its operative position as shown in full lines in Figures 1 and 2, the short leg 19 of the U-shaped bolt 17 will extend through the openings 28 of the guide ribs and through the openings 30 of the spade lug. Thus the spade lug will extend radially beyond the tire 7 and will engage the ground and give the desired traction to the wheel.

When it is no longer necessary to use the spade lugs, the long leg 18 of the latch bolt 17 is pushed inwardly against the tension of the spring 31 and the short leg 19 will be moved away from the guide ribs 13 and out of the openings 28 and 30. The spade lug can now be swung on the bearing sleeve inwardly toward the hub and after the lug is so disposed, the bolt 17 is turned so as to align the short leg 19 with the openings 29 in the guide ribs 13. The long leg 18 can now be released so as to allow the short leg 19 to ride into the openings 29 in the guide ribs and in the openings 30 in the spade lug. Hence the spade lug will be held in its inoperative position against accidental swinging movement.

From the foregoing description, it can be seen that I have provided a spade lug which can be carried by a tractor wheel and later swung to an inoperative or operative position as desired.

Changes in details may be made without departing from the spirit or the scope of my invention, but what I claim as new is:

1. An attachment for tractor wheels comprising a supporting bracket having spaced parallel guide ribs, a spade lug having its inner end received between said ribs, the ribs being provided with aligned pivot openings and the inner end of said lug being also provided with a pivot opening, a U-shaped bolt having a long leg and a short leg, the long leg being slidably mounted in the openings in the ribs and the blade, whereby the blade can be swung on said long leg to one side of the bracket or the other, said ribs also having pairs of aligned openings on each side of the pivot opening and said lug being provided with a latch opening beyond the pivot opening for registration with either pair of said last mentioned openings, the short leg of the bolt being selectively movable into either pair of the last mentioned openings of the ribs and through the latch opening in the lug, and spring means normally holding the short leg in a selected position against accidental displacement.

2. An attachment for tractor wheels comprising a supporting bracket adapted to be secured at its inner end to a tractor wheel, the outer end of said bracket being provided with a supporting plate, spaced parallel guide ribs formed on the plate having central transversely aligned openings, a spade lug including a center blade and side reinforcing plates, the center blade being received between the ribs and the inner ends of the plates engaging the outer faces of the ribs, the inner end of the center blade and plates being provided with aligned openings, a bearing sleeve fitted in the openings in the ribs and spade lug, a U-shaped latch bolt having a long leg and a short leg, the long leg being slidably mounted in the bearing sleeve, said ribs also having pairs of aligned openings on each side of the bearing sleeve and said lug being provided with latch openings beyond the sleeve for registration with either pair of said last mentioned openings, the short leg of the bolt being selectively movable into either pair of the last mentioned openings of the ribs and through the latch openings in the lug, and spring means normally holding the short leg in a selected position against accidental displacement.

ROCHE J. VAN DE HEY.